(12) United States Patent
Rivault et al.

(10) Patent No.: US 9,399,519 B2
(45) Date of Patent: Jul. 26, 2016

(54) SELF-TENSIONING GIRT

(71) Applicant: AERAZUR S.A., Cognac (FR)

(72) Inventors: Jean-Yves Rivault, Hiersac (FR); Stephane Berlureau, Bouthiers (FR)

(73) Assignee: Zodiac Aerosafety Systems, Cognac (FR)

( * ) Notice: Subject to any disclaimer, the term of this patent is extended or adjusted under 35 U.S.C. 154(b) by 224 days.

(21) Appl. No.: 14/307,252

(22) Filed: Jun. 17, 2014

(65) Prior Publication Data

US 2014/0366341 A1    Dec. 18, 2014

Related U.S. Application Data

(60) Provisional application No. 61/835,733, filed on Jun. 17, 2013.

(51) Int. Cl.
   *B64D 25/14*    (2006.01)
   *B60P 7/08*    (2006.01)
   *B63B 27/14*    (2006.01)

(52) U.S. Cl.
   CPC .............. *B64D 25/14* (2013.01); *B60P 7/0823* (2013.01); *B63B 2027/145* (2013.01); *Y10T 24/3771* (2015.01)

(58) Field of Classification Search
   None
   See application file for complete search history.

(56) References Cited

U.S. PATENT DOCUMENTS

| | | | | |
|---|---|---|---|---|
| 2,765,131 A | * | 10/1956 | Boyle | B64D 25/14 182/48 |
| 3,102,623 A | * | 9/1963 | Schacht | A62B 1/20 182/48 |
| 3,621,383 A | * | 11/1971 | Rush | B64D 25/14 182/48 |
| 3,634,914 A | * | 1/1972 | Schroedter | B64D 25/14 16/325 |
| 3,771,749 A | * | 11/1973 | Smialowicz | B64D 25/14 182/48 |
| 4,444,290 A | | 4/1984 | Valerio | |
| 5,906,340 A | * | 5/1999 | Duggal | B64D 25/14 182/48 |
| 6,722,307 B1 | | 4/2004 | Rogers | |
| 7,090,168 B1 | | 8/2006 | Brown | |
| 2011/0278092 A1 | * | 11/2011 | Brown | A62B 1/20 182/48 |

OTHER PUBLICATIONS

International Patent Application No. PCT/IB2014/062310, International Search Report and Written Opinion dated Sep. 17, 2014, 11 pages.

\* cited by examiner

*Primary Examiner* — Jack W Lavinder
(74) *Attorney, Agent, or Firm* — Kilpatrick Townsend & Stockton LLP; Dean W. Russell; Tiffany L. Williams

(57) ABSTRACT

Described are self-tensioning girt assemblies with one or more straps that form loops that extend around opposing sides of an inflatable structure. The one or more strips are configured to apply multi-directional forces such that the girt assembly is self-tensioning. The self-tensioning girt assemblies may comprise at least two sleeves coupled to the inflatable structure and that receive the straps in a way that permits the straps to rotate around the inflatable structure. In some embodiments, the straps are attached to a panel that extends between the straps.

12 Claims, 7 Drawing Sheets

SELF-TENSIONING GIRT

CROSS REFERENCE TO RELATED APPLICATIONS

This application is related to and claims priority benefits from U.S. Provisional Application Ser. No. 61/835,733 ("the '733 application"), filed on Jun. 17, 2013, entitled SELF-TENSIONNING GIRT. The '733 application is hereby incorporated in its entirety by this reference.

FIELD OF THE INVENTION

The invention relates to evacuation slides for use with passenger vehicles or the like.

BACKGROUND

Over the past fifty years, inflatable evacuation slides, such as the evacuation slide shown in FIG. 1, have been designed for use with passenger vehicles. Typically, an inflatable evacuation slide is required on passenger vehicles where the doorway height is such that passengers would be unable to exit from the door uninjured.

In such applications, a girt is used to make the connection between the evacuation slide and the door sill of the passenger vehicle. A girt generally is used to make a connection between any inflatable structure and a rigid structure so as to permit inflatable attachment and to allow the transfer to mechanical stress. For example, girts may also be used to attach life rafts to an aircraft or floats to rotorcraft.

The necessity of having to engage (connect) and disengage (disconnect) the evacuation slide to and from the passenger vehicle door each time the door is closed and re-opened has dictated the use of a girt bar and fabric girt on traditional passenger vehicles to facilitate this process. The girt bar concept has been used for fifty years and has undergone many changes.

In the prior art designs, as illustrated in FIGS. 1-2, the fabric girt 12 is attached at opposite ends of the girt bar 48, which results in a load being applied at the ends of the girt bar 48, creating a substantial bending moment at the center of the bar 48. As a result, girt bars tend to flex and, if inadequately designed, could lead to catastrophic failure. Accordingly, most prior art girt bars are made from high strength materials that are capable of withstanding such loads, which are often quite heavy as well.

Furthermore, the girt bar design requires attachment points in the floor of the aircraft to secure the girt bar to the aircraft when the evacuation slide is deployed. These attachment points can accumulate ice, dust, or other obstructions that may prevent the girt bar from properly engaging with these attachment points.

In order to reduce the weight associated with girt bars, as well as problems associated with the girt bar attachments, it may be desirable to have a lighter girt attachment design that does not require the use of attachment points in the floor of the aircraft.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Described are self-tensioning girt assemblies with straps that extend around the sides of an inflatable structure and that are configured to apply multi-directional forces. In some embodiments, the self-tensioning girt assemblies may comprise at least two sleeves coupled to the inflatable structure and that receive the straps in a way that permits the straps to rotate around the inflatable structure. In some embodiments, the straps are attached to a flexible or rigid panel that extends between the straps.

DETAILED DESCRIPTION

Figure 1:
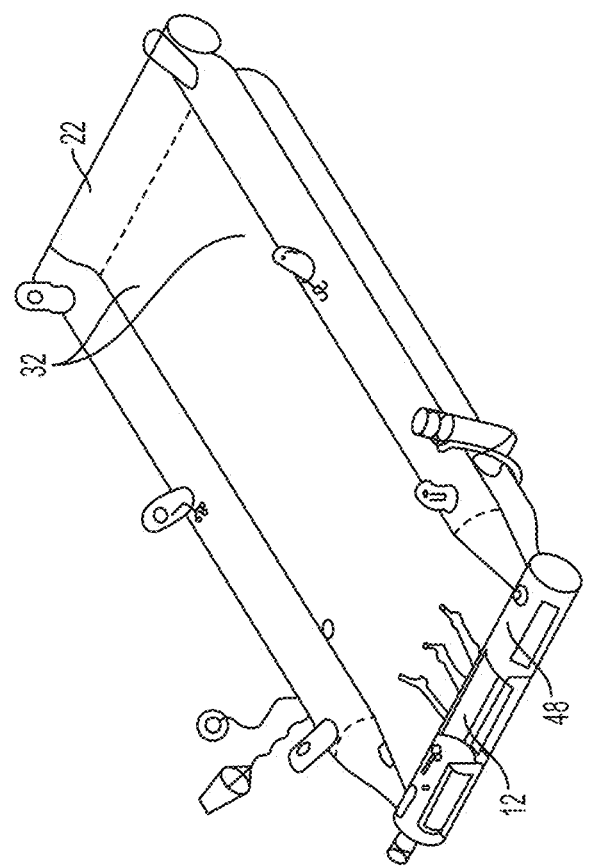
FIG. 1 is a perspective view of a conventional girt bar and girt attached to an inflatable structure in an inflated state.
Figure 2:
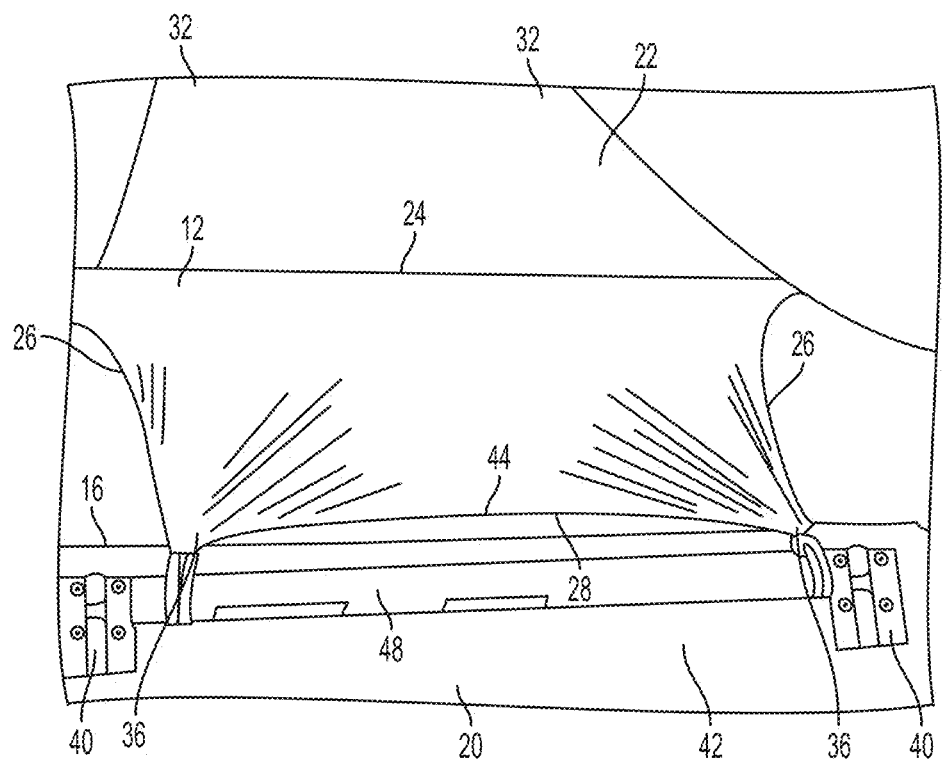
FIG. 2 is a partial perspective view of the girt bar and girt of FIG. 1 attached to the inflatable structure in the inflated state.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a self-tensioning girt assembly for use with an evacuation slide or other inflatable structure. While the girt assemblies are discussed for use with aircraft, they are by no means so limited. Rather, embodiments of the girt assemblies may be used in conjunction with evacuation slides or other inflatable structures for vehicles of any type or otherwise as desired.

FIGS. 4-7 illustrate embodiments of a self-tensioning girt assembly 10. In these embodiments, the girt assembly 10 includes at least two straps 14, with each strap forming a loop 30 that loops around an inflatable structure 22 and attaches in any suitable way to passenger vehicle 20. Although the girt assembly 10 is illustrated as having two straps 14, any suitable number of straps 14 may be used. If more than one strap 14 is used, one or more of the straps 14 may be linked together, but they need not be. The one or more straps 14 may be formed of any woven or non-woven material having sufficient tensile and/or tear strength. As described below, the straps 14 are arranged with respect to the inflatable structure 22 and the passenger vehicle 20 such that they apply multi-directional forces and are therefore self-tensioning when the inflatable structure 22 expands during inflation.

Figure 4:
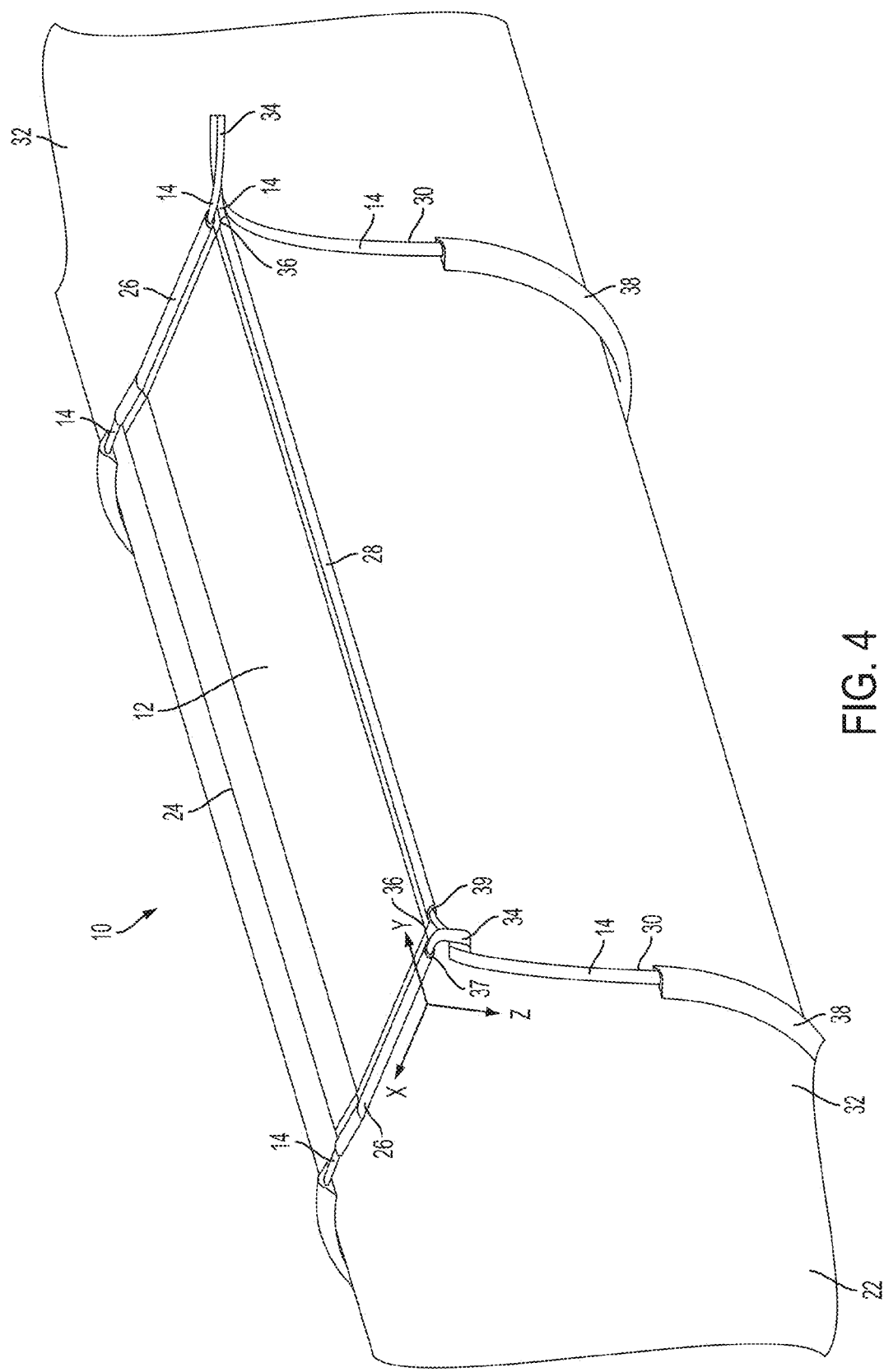
FIG. 4 is a perspective view from inside an aircraft of a self-tensioning girt coupled to an inflatable structure in an inflated state, according to certain embodiments of the present invention.
Figure 5:
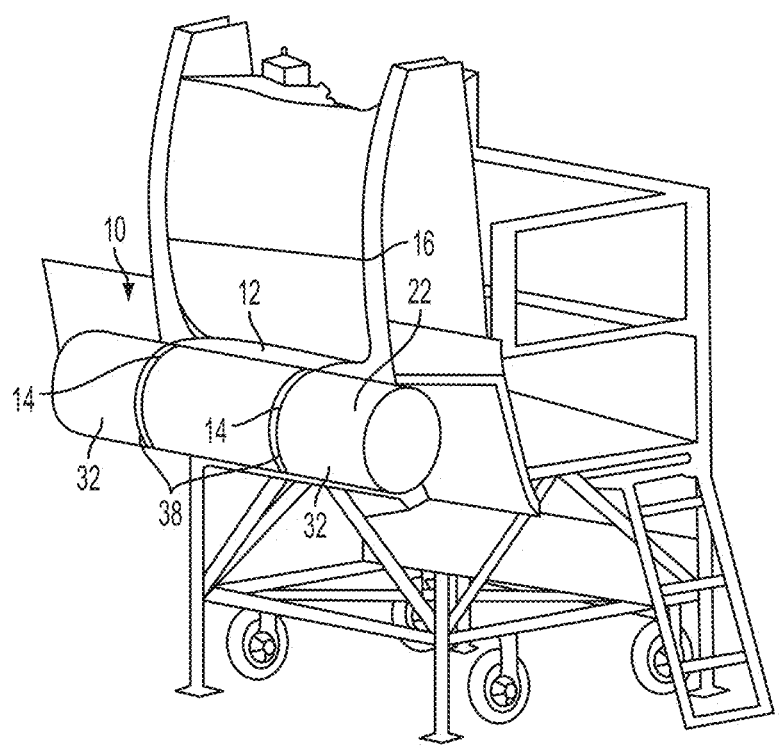
FIG. 5 is a perspective view from outside a mock aircraft structure of the self-tensioning girt of FIG. 4 coupled to an inflatable structure in an inflated state.
Figure 6:
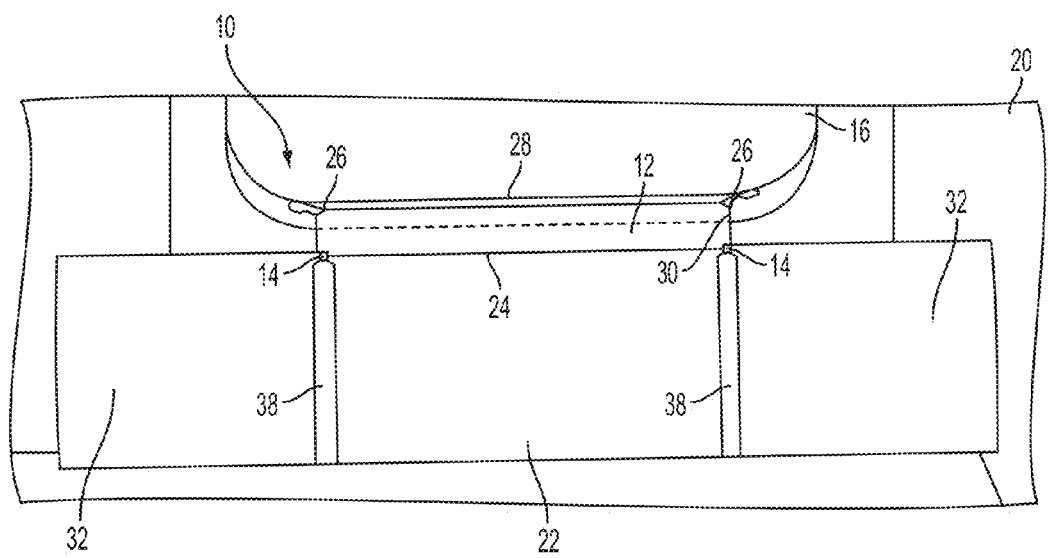
FIG. 6 is a front view from outside an aircraft of the self-tensioning girt of FIG. 4 coupled to an inflatable structure in an inflated state.

In certain embodiments, as shown in FIGS. 4-6, each strap 14 is positioned within a corresponding one of a pair of sleeves 38 so that the loops 30 slide within the sleeves 38 as the inflatable structure 22 expands during inflation. Each sleeve 38 may be glued, sewn, molded, formed with, welded, or otherwise attached to the inflatable structure 22 in a way that permits each strap 14 to slide around the inflatable structure 22 in the sleeve 38. The straps 14 may be tethered through the sleeves 38 and attached to passenger vehicle 20 in any suitable way to provide forces in any desired direction.

The girt assembly 10 may be attached to the passenger vehicle 20 in any suitable manner. As one example, each of the straps 14 may include an attachment loop 34 configured to couple to a girt bracket 40, which may be mounted to a floor 42 of the passenger vehicle 20. Each girt bracket 40 may be formed of stainless steel, aluminum, other metallic materials, composite materials, or other suitable materials. The girt assembly 10 could also be attached to the passenger vehicle 20 using any suitable means, including but not limited to, fittings, fabrics, straps, cords, brackets, etc.

In some non-limiting embodiments, such as the embodiment illustrated in FIGS. 4-7, girt assembly 10 includes an optional panel 12 that extends between straps 14. Panel 12 may have any suitable shape including but not limited to rectilinear, triangular, trapezoidal, elliptical, hourglass, or other suitable shape. The panel 12 may be formed of any flexible or rigid woven or non-woven material having sufficient tensile and/or tear strength. The dimensions of the panel 12 are substantially determined by the dimensions of a passenger vehicle (or aircraft) doorway 16, as the panel 12 must be sufficiently long to reach between girt brackets 40 and some distance outside a passenger vehicle (or aircraft) 20, and must be sufficiently wide so as to provide the necessary stability for an inflatable structure 22 attached to the panel 12.

If panel 12 is used, at least a first end 24 of the panel 12 is positioned adjacent the inflatable structure 22 as shown in FIGS. 4-7. In the illustrated embodiment, one or more straps 14 are attached to sides 26 and an opposing end 28 of the panel 12. As shown in FIG. 4, portions of the one or more straps 14 that are attached to sides 26 of the panel also form loops 30 that extend around opposing sides 32 of the inflatable structure 22 and return to reattach to the end 28 of the panel 12. FIG. 4 illustrates two loops 30, although straps 14 may form any suitable number of loops that extend around inflatable structure 22. As illustrated in FIG. 4, the one or more straps 14 extend through an opening 37 of sides 26 and an opening 39 of end 28 of the panel 12 to attach the straps 14 to the sides 26 and the end 28 of the panel 12. However, the one or more straps 14 may be attached to the panel 12 via any suitable means, including but not limited to sewing, gluing, bonding, rivets, or other suitable mechanical or chemical fastening technique. In other embodiments, the one or more straps 14 may only be attached to at least a portion of a respective side 26 of the panel 12 and/or may only be attached to at least a portion of the end 28 of the panel 12. In some embodiments, the one or more straps 14 may be attached in any suitable manner to at least a portion of a respective side 26 and at least a portion of the end 28 of the panel 12 adjacent a corner 36.

Portions of the strap 14 that extend from the loops 30 may further extend to form at least two attachment loops 34 located at opposing locations on the second end 28 of the panel 12. In certain embodiments, as shown in FIGS. 4-7, the attachment loops 34 may be proximate corners 36 of the panel 12 and may be used to attach straps 14 to the passenger vehicle 20. However, a person of ordinary skill in the relevant art will understand that the attachment loops 34 may be attached at any suitable location along the end 28 of the panel 12 and that more than two attachment loops 34 may be used as needed or desired.

In the case where strap 14 is formed of a single integral piece of material, the ends of the strap 14 may be spliced together at the point where the ends meet after attaching to the sides 26 and the end 28 of the girt to form the loops 30 and/or the attachment loops 34, and that the location where the ends meet may be at any suitable location along the entire path of the strap 14. While it may be desirable in certain instances to minimize the number of splices required to form the length of the strap 14 necessary to form the above features of the strap 14, separate pieces of material may be used to form the features of the girt assembly 10 (including, for example, some or all of the portions of the strap 14 that are attached to the sides 26 and the second end 28, the portions of the strap 14 that form the loops 30, and/or the portions of the strap 14 that form the attachment loops 34). Along these lines, as mentioned, instead of being formed of a single piece of material, two or more separate straps 14 may be used.

In some embodiments, the one or more straps 14 may be attached to the panel 12 so that one of the loops 30 (after extending around the inflatable structure 22) reattaches to the end 28 of the panel 12 at or near the location where one of the corresponding attachment loops 34 attaches to the end 28 of the panel 12. The same attachment configuration may be used at the opposing attachment locations on the second end 28 of the panel 12.

When the inflatable structure 22 is deployed, a slide container may be dragged outboard, wherein the slide container rotates out of the passenger vehicle doorway 16 as a passenger vehicle door is opened. As the slide container falls out of the passenger vehicle doorway 16, inflation of the inflatable structure 22 is initiated. The inflatable structure 22 deploys and inflates to its intended position between the ground and the passenger vehicle 20 for evacuation.

Figure 7:
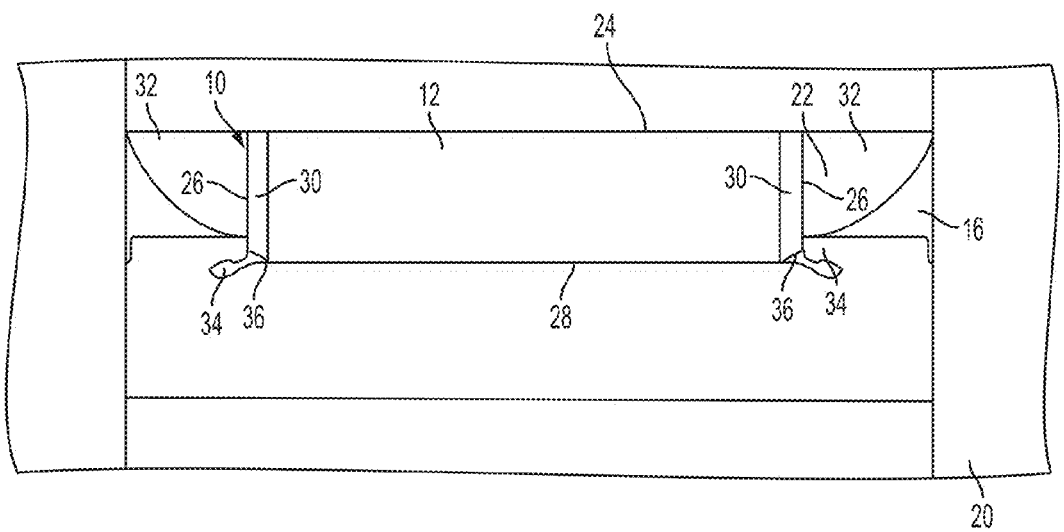
FIG. 7 is a front view from inside an aircraft of the self-tensioning girt of FIG. 4 coupled to an inflatable structure in an inflated state.

Because the panel 12 is coupled to the inflatable structure 22 via the loops 30 and sleeves 38, the girt assembly 10 is pulled along by the inflatable structure 22, which in turn causes the panel 12 to rotate about the girt brackets 40. The girt assembly 10 continues to rotate until the panel 12 is extended outboard from the passenger vehicle 20 across the passenger vehicle doorway 16. In this deployed position, as best shown in FIG. 7, the girt assembly 10 may serve as a footstep/walkway and platform for passengers to reach the inflatable structure 22. If designed for use as a footstep or walkway, the panel 12 may be any suitable rigid or flexible structure that is tensioned enough to serve as a footstep or walkway. In some embodiments, when in the deployed position, the panel 12 fills any gaps between the passenger vehicle 20 and the inflatable structure 22.

As the inflatable structure 22 inflates, as described above, the loops 30 formed by straps 14 are tightened, which causes a force to be applied to the straps 14. As best illustrated in FIG. 4, because each loop 30 in the illustrated embodiment is attached to one of the corners 36 of the panel 12 along at least a portion of sides 26 of the panel 12, a force is applied to the panel 12 at each corner 36 pulling in a first (or X) direction along the portion of the loop 30 attached to the side 26 and in a second (or Z) direction along the other end of the loop 30. As the panel 12 is pulled at each corner 36 by the loops 30, the portion of the strap 14 that is attached to the end 28 is also pulled at each corner 36, thus applying a force in a third (or Y) direction along the strap 14 that is attached to the end 28.

Figure 3:
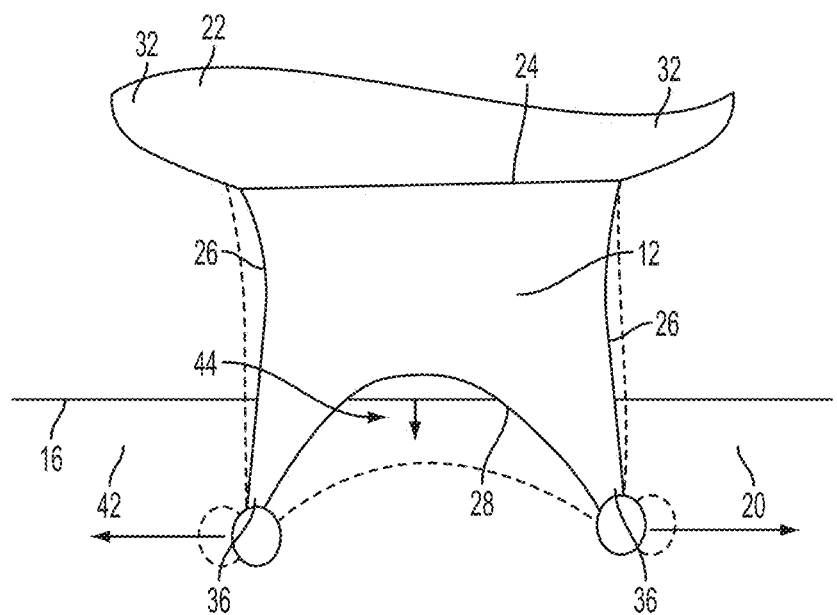
FIG. 3 is a schematic showing the difference in tension between the conventional girt bar and girt design of FIG. 1 and a self-tensioning girt.

The multi-directional forces that are applied to the panel 12 at each corner 36 of the panel 12 via the straps 14 cause the panel 12 to be self-tensioning when the inflatable structure 22 is inflated. The multi-directional forces that are applied to the corners 36 of the panel 12 creates a substantially uniform tension across the second end 28 of the panel 12 so that the panel 12 remains tight along the entire end 28. As a result, as illustrated in the schematic shown in FIG. 3, a gap 44 (that conventionally is formed in the center of the panel 12 when the tension force is concentrated at the points where the attachment loops 34 are connected to the panel 12) is reduced in the self-tensioning girt assembly 10 because the tension force is no longer concentrated at the attachment points, but rather is evenly distributed across the panel 12 via the multi-directional forces. As described above, if panel 12 is not used, straps 14 can be still be configured to apply multi-directional forces that cause the straps 14 to be self-tensioning when the inflatable structure 22 is inflated.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A self-tensioning girt assembly comprising:
at least two brackets;
a strap comprising
a first loop formed by positioning a first portion of the strap around a first end of an inflatable structure;
a second loop formed by positioning a second portion of the strap around a second end of the inflatable structure;
wherein an end of each loop is coupled to one of the at least two brackets;
wherein the strap is configured to slide around the ends of the inflatable structure when the inflatable structure is inflated to adjust a size of the loops so that tension applied to the strap by the inflatable structure is uniformly distributed between the at least two brackets.

2. The self-tensioning girt assembly of claim 1, wherein each of the loops is positioned within a sleeve that is positioned around each end of the inflatable structure.

3. The self-tensioning girt assembly of claim 2, wherein the strap slides around the ends of the inflatable structure within each sleeve.

4. The self-tensioning girt assembly of claim 1, further comprising a panel comprising sides, wherein each side is attached to one of the first loop and the second loop.

5. The self-tensioning girt assembly of claim 4, wherein the panel further comprises a first end that is attached to a third portion of the strap that extends between the first loop and the second loop.

6. The self-tensioning girt assembly of claim 5, wherein the panel further comprises a second end that is positioned adjacent the inflatable structure.

7. The self-tensioning girt assembly of claim 5, wherein the uniform distribution of the tension between the at least two brackets also applies a uniform tension to the first end of the panel.

8. The self-tensioning girt assembly of claim 4, wherein the panel extends between the inflatable structure and a passenger vehicle doorway.

9. The self-tensioning girt assembly of claim 8, wherein the panel is configured to serve as a footstep.

10. The self-tensioning girt assembly of claim 4, wherein the panel is flexible and tensioned.

11. The self-tensioning girt assembly of claim 4, wherein the panel is rigid.

12. The self-tensioning girt assembly of claim 1 wherein the at least two brackets are attached to a passenger vehicle.

* * * * *